United States Patent [19]

Byrne

[11] Patent Number: 4,676,371
[45] Date of Patent: Jun. 30, 1987

[54] FOOD STORAGE CONTAINER

[76] Inventor: Bernie Byrne, 9401 SW. 118 Ter., Miami, Fla. 33176

[21] Appl. No.: 911,724

[22] Filed: Sep. 26, 1986

[51] Int. Cl.[4] .................... B65D 75/58; B65D 83/00; B65D 85/34
[52] U.S. Cl. .............................. 206/44.12; 206/45.19; 206/45.34; 221/303; 312/45; 312/49; 312/72
[58] Field of Search .................. 221/303, 305; 312/45, 312/49, 72; 206/815, 817, 45.19, 45.34, 526, 44.12; 220/82 R

[56] References Cited

U.S. PATENT DOCUMENTS 1,341,893  6/1920  Gerald .............................. 312/45 X
1,471,167 10/1923  Jung .................................. 206/45.34

Primary Examiner—William Price
Attorney, Agent, or Firm—John Cyril Malloy

[57] ABSTRACT

A food storage container, such as for a type of fruit or vegetable, with an upwardly facing mouth with a removable cover for charging food into the container; the container is composed of a plurality of interconnected panels, a floor panel, front, rear and opposing side panels which are of transparent material to display the food while stored in the container; it is further provided with an opening above a stop lip in the front wall panel adjacent the bottom which opening is sized for passage of a person's hand to remove a piece of the displayed food from a horizontal floor portion at the mouth which floor portion merges and blends with an inclined floor portion extending from the horizontal portion rearwardly and upwardly between the side walls so that another piece of food moves under the influence of gravity onto the horizontal floor portion at the mouth whenever a piece has been removed from the container.

10 Claims, 2 Drawing Figures

FOOD STORAGE CONTAINER

FIELD OF THE INVENTION

This invention relates to a transparent container to store and display food, such as a type of fruit or type of vegetable.

BACKGROUND OF THE INVENTION

In the past there have been many containers in which food may be stored. Often such containers are provided with relatively complex dispensing means. This field is somewhat crowded and, with respect to containers or receptacles intended for refrigerators, concerning which much attention has been given to maximize space planning and hence conserve energy, the field is highly developed.

SUMMARY OF THE INVENTION

This invention is of an improved and transparent container optimally sized and adapted to store and simultaneously display food, such as a type of fruit, for example, oranges, apples or grapefruits; and it is sized and configured optimally for placement either on a shelf in a refrigerator or on any flat surface, such as a kitchen countertop or tabletop. Eating more fruits and vegetables and less fat containing foods is now recognized as an important step in the reduction of elevated cholesterol and high lipid blood content. This invention by reason of being configured overall so as to tempt eating fatless items by visually displaying them for convenient removal from the container promotes the goal of good health. The device is configured so as to fit on a refrigerator shelf without the need of removing, or indeed moving, the container to remove a cooled temptingly displayed piece of food, such as an orange; and because of its structure, once a piece has been removed, another piece is immediately automatically and efficiently positioned and presented at a front opening discharge mouth which is optimally sized for easy removal of the next piece. On the other hand, the same container may also be conspicuously positioned on any selected flat surface, such as a countertop or tabletop to encourage further eating the selected food contained within it.

OBJECTS OF THE INVENTION

It is an object of this invention to provide an optimally structured and configured container for fruits or vegetables which is transparent and provides a storage space on a floor with an inclined portion and a flat portion which is adjacent a front opening mouth bounded by a lip extending slightly above the floor level which acts as a stop means so that whenever a displayed piece of fruit, for example, is removed, another is immediately automatically and efficiently presented at the mouth and which container may be utilized either on a refrigerator shelf or on any selected flat surface, such as a tabletop or kitchen countertop.

In accordance with these and other objects which will become more apparent hereinafter, the instant invention will now be described with reference to the accompanying drawings in which:

DESCRIPTION OF THE PREFERRED EMBODIMENT

Figure 1:
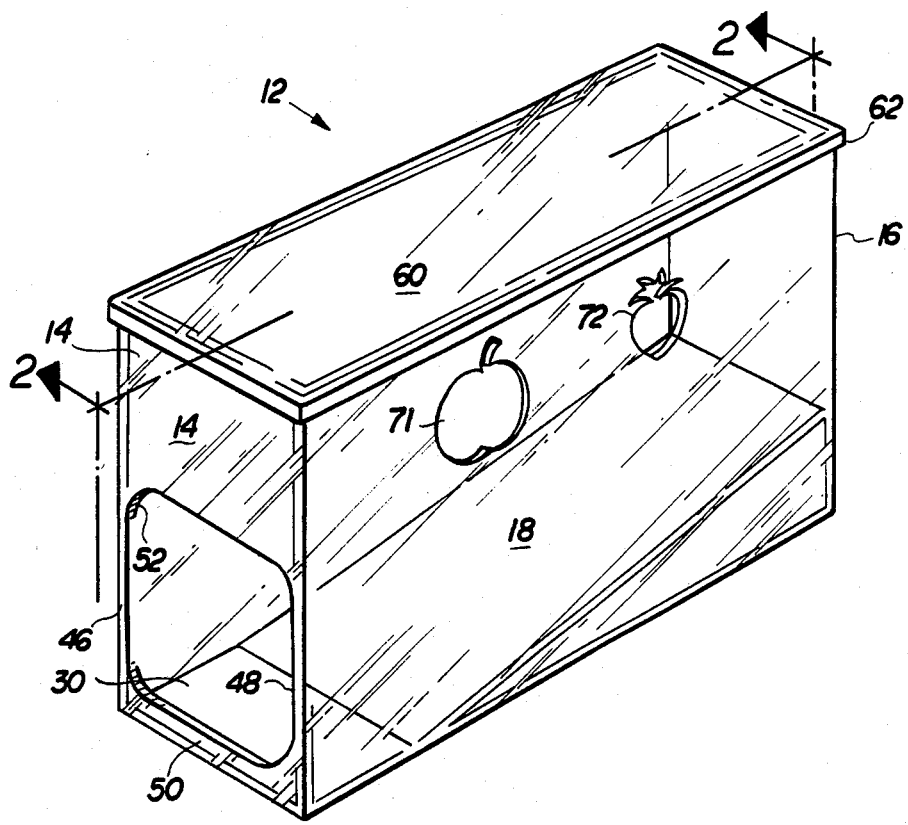
FIG. 1 is a perspective view of the instant invention.
Figure 2:
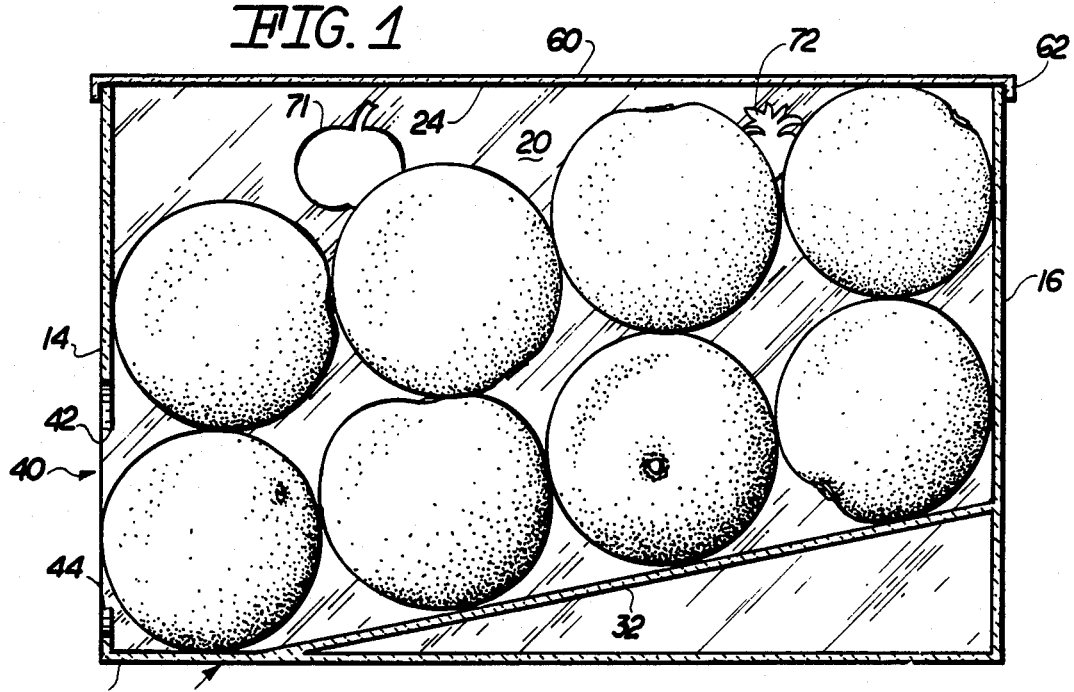
FIG. 2 is a view in cross-section taken on the plane indicated by the line 2—2 of FIG. 1 and looking in the direction of the arrows.

Referring to the drawings it is seen that the container for storing fruits or vegetables is generally designated by the numeral 12. It is composed of a integral construction including a floor 13, and a transparent front panel 14, a rear panel 16, and opposing side panels 18 and 20. If not of the preferred one piece molded or integral structure, suitable means, such as an adhesive means are provided for interconnecting the panels in perpendicular relationship to one another, as shown, defining the container walls. As shown in the drawings, each of the panels are preferably of a common height, described more fully hereinafter, so that their upper ends, such as that designated by the numeral 24 on the side panel 20, define an upwardly opening container mouth. Preferably, the container is of one piece mold transparent plastic in the rigid range.

The container is provided with a floor which includes a lowermost horizontal portion 30 and an inclined portion 32. The lower portion 30 extends from the front wall 14 towards the rear wall and between the side panels 18 and 20 a distance of between 2" and 4", and preferably 2½", while the inclined portion 32 extends upwardly and rearwardly from the horizontal lower portion to the rear wall 16 and between the side panels or walls.

In the front wall 14 there is an opening 40 bounded by an upper and lower horizontal edge 42 and 44 respectively and opposing side edges 46 and 48. The upper edge 42 is spaced from the lower edge a distance of at least 4", preferably; and the lower edge is between ¼" and ½" above the floor defining a stop means or lip 50. At the junctures of the edges of the mouth, the front panel is rounded, as at 52 for example, and the mouth spans the distance between the side panels to permit easy entrance of a user's hand.

Preferably the side panels are spaced from one another a distance in the range of between 4" and 6" and preferably between 4½" and 5½". The inclined portion is at an angle with respect to the horizontal plane of the lower floor portion of between 10° and 30° and preferably about 20°. Further, the front and rear panels are spaced from one another a distance of between 12" and 18" and preferably about 15" while the overall height of the container is between 6" and 12". Preferably, the central zone of the side panels adjacent their upper ends may be provided with vent means, which in a preferred embodiment are decorative and may be openings, for example, in the shape of a pair of apples 71 and 72 or oranges. These openings of this embodiment permit cross ventilation and air circulation.

Finally, cap means are provided as designated by the numeral 60 which includes a peripheral skirt portion 62 which is sized and configured to telescopically nest over the upper ends of the wall panels for removal and charging the storage container with a type of fruit such as apples, oranges or grapefruit, or other items such as tomatoes or potatoes.

In use, the device, which is of transparent panels, may be positioned either on a flat surface, such as a table or countertop or on a refrigerator shelf to store and display food items such as a selected fruit. In use, one simply removes the piece of fruit that is accessible through the opening in the front panel whereupon the other pieces remaining in the container will, under the influence of gravity, readjust their positions automatically and efficiently presenting another piece on the horizontal portion for easy removal of it. One of the main advantages is that, since the container is transparent, one seeing it is immediately reminded that it is healthy to eat fruit and is tempted by the pleasing manner it is displayed and the convenience of having it easily accessible.

It is thus seen that there has been provided an optimally sized and configured storage container for food so that it is tempting and visibly displayed and in which there are no complicated shoots or mechanisms for dispensing the items within it but which nevertheless accomplishes its intended purpose in a simple structure which may either be positioned on a refrigerator shelf, for example, or placed on any convenient flat surface, such as a shelf or countertop, which will be most common in Northern portions of the United States; and the user may either use a removable lid or not.

While the instant invention has been shown and described in what is considered to be a practical and preferred embodiment, it is recognized that departures may be made therefrom within the spirit and scope of this invention which is, therefore, not to be limited except as set forth in the claims hereinafter and in accordance with the doctrine of equivalents.

What is claimed is:

1. A storage container comprising:

a front, rear, and opposing side wall panels of transparent material including means interconnecting said panels in perpendicular relation to one another, each of said panels having an upper end defining a container mouth therebetween, said container having a floor including a lower horizontal portion and an inclined portion, said lower portion extending from said front wall towards said rear wall between said side panels a distance of between 2" and 4", and said inclined portion extending upwardly and rearwardly from said lower portion to said rear wall, an opening in said front wall having a lower edge, an upper edge and lower horizontal edge and opposing side vertical edges, said upper edge being spaced from said lower edge a distance of at least 4" and said lower edge being between $\frac{1}{8}$" and $\frac{1}{2}$" above said floor defining a stop means lip, said opposing side edges being at said opposing side panels, and said edges of said opening being smoothly rounded at their respective junctures, said side wall panels being spaced from one another a distance in the range of between 4" and 6" and said inclined portion being at an angle with respect to the plane of said lower portion of between 10° and 30°, said front and rear walls being spaced from one another a distance of between 12" and 18" and said panels being of a height of between 6" and 12".

2. The container as set forth in claim 1 including cap means sized to cover said mouth and being configured to telescopically engage said panels adjacent said upper ends to selectively open and close said container.

3. The container as set forth in claim 1 wherein said container is of one piece integral construction.

4. The container as set forth in claim 3 wherein said container is of plastic material.

5. The container as set forth in claim 1 wherein the overall height of said container is 6".

6. The container as set forth in claim 1 wherein the overall height of said container is about 12".

7. The container as set forth in claim 1 wherein said horizontal floor portion extends about 2$\frac{1}{2}$" from said front panel towards said rear panel and between said side panels.

8. The container as set forth in claim 1 wherein said stop means lip is at least about $\frac{1}{4}$" above said horizontal floor portion.

9. The container as set forth in claim 1 wherein vent means are provided in each of said side panels adjacent their respective upper ends.

10. The container as set forth in claim 1 wherein said container is of an overall depth between said front wall panel and said rear wall panel of about 15".

* * * * *